(12) United States Patent
Fortin et al.

(10) Patent No.: US 11,012,146 B2
(45) Date of Patent: May 18, 2021

(54) SYSTEM AND METHOD FOR AIRCRAFT DATA TRANSMISSION

(71) Applicant: PRATT & WHITNEY CANADA CORP., Longueuil (CA)

(72) Inventors: Frederic Fortin, Ste-Catherine (CA); James Jarvo, Saint-Bruno (CA); Jonathan Miller, Natick, MA (US)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/783,244

(22) Filed: Feb. 6, 2020

(65) Prior Publication Data

US 2020/0259557 A1    Aug. 13, 2020

Related U.S. Application Data

(60) Provisional application No. 62/803,830, filed on Feb. 11, 2019.

(51) Int. Cl.
| | |
|---|---|
| *H04W 4/00* | (2018.01) |
| *H04B 7/185* | (2006.01) |
| *H04B 1/3822* | (2015.01) |
| *B64F 5/60* | (2017.01) |
| *G07C 5/08* | (2006.01) |
| *H01Q 1/28* | (2006.01) |
| *G07C 5/00* | (2006.01) |
| *B64D 45/00* | (2006.01) |

(52) U.S. Cl.
CPC ............ *H04B 7/18506* (2013.01); *B64F 5/60* (2017.01); *G07C 5/008* (2013.01); *G07C 5/085* (2013.01); *H01Q 1/28* (2013.01); *H04B 1/3822* (2013.01); *B64D 2045/0085* (2013.01)

(58) Field of Classification Search
USPC .......... 455/431; 701/3, 16, 99; 340/430, 981
See application file for complete search history.

(56) References Cited

U.S. PATENT DOCUMENTS

| | | | |
|---|---|---|---|
| 4,797,657 A | * | 1/1989 | Vorzimmer ............ G08B 13/19 340/430 |
| 5,974,349 A | | 10/1999 | Levine |
| 6,047,165 A | | 4/2000 | Wright et al. |
| 6,104,914 A | | 8/2000 | Wright et al. |

(Continued)

FOREIGN PATENT DOCUMENTS

EP    774724    5/1997

*Primary Examiner* — David Q Nguyen
(74) *Attorney, Agent, or Firm* — Norton Rose Fulbright Canada LLP

(57) ABSTRACT

A communication system and a method for transmitting data from an aircraft, the aircraft comprising at least one engine. A data collection and transmission unit is configured to collect and transmit data received from one or more locations in the aircraft, the data collection and transmission unit comprising at least one radio transmitter. At least one engine controller for the at least one engine is communicatively coupled to the data collection and transmission unit and configured to transmit, while the aircraft is airborne, engine data to the data collection and transmission unit, and, responsive to determining that the aircraft is on ground, cause the at least one radio transmitter to activate for transmitting the engine data from the data collection and transmission unit to at least one ground equipment.

12 Claims, 5 Drawing Sheets

(56) References Cited

U.S. PATENT DOCUMENTS

| | | | |
|---|---|---|---|
| 6,108,523 A | 8/2000 | Wright et al. | |
| 6,148,179 A | 11/2000 | Wright et al. | |
| 6,154,636 A | 11/2000 | Wright et al. | |
| 6,154,637 A | 11/2000 | Wright et al. | |
| 6,160,998 A | 12/2000 | Wright et al. | |
| 6,163,681 A | 12/2000 | Wright et al. | |
| 6,167,238 A | 12/2000 | Wright | |
| 6,167,239 A | 12/2000 | Wright et al. | |
| 6,173,159 B1 | 1/2001 | Wright et al. | |
| 6,181,990 B1 | 1/2001 | Grabowsky et al. | |
| 6,262,659 B1 | 7/2001 | Korkosz et al. | |
| 6,308,044 B1 | 10/2001 | Wright et al. | |
| 6,308,045 B1 | 10/2001 | Wright et al. | |
| 6,353,734 B1 | 3/2002 | Wright et al. | |
| 6,522,867 B1 | 2/2003 | Wright et al. | |
| 6,671,589 B2 | 12/2003 | Holst et al. | |
| 6,829,527 B2 | 12/2004 | Felke et al. | |
| 6,845,306 B2 | 1/2005 | Henry et al. | |
| 6,915,189 B2 | 7/2005 | Igloi et al. | |
| 7,310,573 B2 | 12/2007 | Stickling | |
| 7,363,129 B1 | 4/2008 | Barnicle et al. | |
| RE40,479 E | 9/2008 | Wright et al. | |
| 7,595,739 B2 | 9/2009 | Ziarno | |
| 7,627,406 B2 | 12/2009 | Wang et al. | |
| 7,693,614 B2 * | 4/2010 | Turung | B64D 45/0015 701/3 |
| 7,835,734 B2 | 11/2010 | Eckert et al. | |
| 7,844,385 B2 | 11/2010 | Loda et al. | |
| 7,908,042 B2 | 3/2011 | Brinkley et al. | |
| 8,078,354 B2 | 12/2011 | Loda | |
| 8,107,412 B2 | 1/2012 | McGuffin | |
| 8,321,083 B2 | 11/2012 | Beebe et al. | |
| 8,423,009 B2 | 4/2013 | Srinivasan et al. | |
| 8,744,372 B2 | 6/2014 | Ziarno et al. | |
| 8,862,290 B1 * | 10/2014 | Ali | B64D 45/04 701/16 |
| 9,141,830 B2 | 9/2015 | Uczekaj et al. | |
| 9,207,954 B2 | 12/2015 | Mood et al. | |
| 9,239,578 B2 | 1/2016 | Ziarno | |
| 9,367,970 B2 | 6/2016 | Ziarno | |
| 9,576,404 B2 | 2/2017 | Ziarno et al. | |
| 9,607,447 B2 | 3/2017 | Gremmert et al. | |
| 9,767,623 B2 | 9/2017 | Schindler et al. | |
| 9,934,621 B2 | 4/2018 | Gremmert et al. | |
| 10,035,609 B2 | 7/2018 | Ziarno | |
| 2002/0035415 A1 * | 3/2002 | Gardner | B64D 45/0031 701/3 |
| 2002/0111720 A1 | 8/2002 | Holst et al. | |
| 2005/0001756 A1 * | 1/2005 | Wilkinson | F41G 7/2293 342/62 |
| 2006/0047384 A1 | 3/2006 | Robinson et al. | |
| 2007/0027589 A1 | 2/2007 | Brinkley et al. | |
| 2009/0012691 A1 * | 1/2009 | Ziarno | H04B 7/18506 701/99 |
| 2015/0363981 A1 | 12/2015 | Ziarno et al. | |
| 2016/0047880 A1 * | 2/2016 | Helfrick | G01S 5/0231 340/981 |
| 2016/0301481 A1 * | 10/2016 | Lee | H04B 10/25891 |
| 2017/0004610 A1 * | 1/2017 | Lamkin | G06F 3/012 |
| 2019/0012853 A1 | 1/2019 | Scholten et al. | |
| 2019/0356510 A1 * | 11/2019 | Lee | H04B 10/2589 |

\* cited by examiner

SYSTEM AND METHOD FOR AIRCRAFT DATA TRANSMISSION

CROSS REFERENCE TO RELATED APPLICATIONS

This patent application claims priority of U.S. provisional Application Ser. No. 62/803,830, filed on Feb. 11, 2019, the entire contents of which are hereby incorporated by reference.

TECHNICAL FIELD

The present disclosure relates generally to transmitting data from an aircraft.

BACKGROUND OF THE ART

Data is typically collected from various areas of an aircraft and periodically or punctually provided to monitoring stations. For this purpose, the aircraft can be provided with one or more devices configured to gather, store, process, and transmit (via one or more data transmitters) the data. Activating the data transmitters while in flight can however be hazardous to aircraft operation. As a result, stringent certification levels are typically associated with the devices used to collect and transmit aircraft data, resulting in increased development costs. Therefore, improvements are needed.

SUMMARY

In accordance with a broad aspect, there is provided a communication system for transmitting data from an aircraft, the aircraft comprising at least one engine. The system comprises a data collection and transmission unit configured to collect and transmit data received from one or more locations in the aircraft, the data collection and transmission unit comprising at least one radio transmitter, and at least one engine controller for the at least one engine, the at least one engine controller communicatively coupled to the data collection and transmission unit and configured to transmit, while the aircraft is airborne, engine data to the data collection and transmission unit, and, responsive to determining that the aircraft is on ground, cause the at least one radio transmitter to activate for transmitting the engine data from the data collection and transmission unit to at least one ground equipment.

In some embodiments, the at least one engine controller comprises an electrical switch controllable between an open position and a closed position and configured to, when in the closed position, connect the at least one radio transmitter to electrical ground.

In some embodiments, the at least one engine controller is configured to bring the electrical switch to the closed position to cause the at least one radio transmitter to activate.

In some embodiments, the at least one engine controller comprises an electrical switch controllable between an open position and a closed position and configured to, when in the closed position, supply electrical power to the at least one radio transmitter.

In some embodiments, the at least one engine controller is configured to bring the electrical switch to the closed position to cause the at least one radio transmitter to activate.

In some embodiments, the at least one engine controller is configured to output, to the data collection and transmission unit, a discrete control signal comprising instructions to activate the at least one radio transmitter.

In some embodiments, the Design Assurance Level (DAL) associated with the at least one engine controller is higher than the DAL associated with the data collection and transmission unit, the at least one engine controller having a DAL of "A" and the data collection and transmission unit having a DAL lower than "C".

In some embodiments, the data collection and transmission unit is a DAL "E" certified device.

In accordance with another broad aspect, there is provided a computer-implemented method for transmitting data from an aircraft, the aircraft comprising at least one engine. The method comprises, at at least one engine controller for the at least one engine, transmitting, while the aircraft is airborne, engine data to a data collection and transmission unit of the aircraft, and, responsive to determining that the aircraft is on ground, causing at least one radio transmitter of the data collection and transmission unit to activate for transmitting the engine data from the data collection and transmission unit to at least one ground equipment.

In some embodiments, causing at least one radio transmitter of the data collection and transmission unit to activate comprises bringing an electrical switch of the at least one engine controller to a closed position, the electrical switch configured to, when in the closed position, connect the at least one radio transmitter to electrical ground.

In some embodiments, causing at least one radio transmitter of the data collection and transmission unit to activate comprises bringing an electrical switch of the at least one engine controller to a closed position, the electrical switch configured to, when in the closed position, supply electrical power to the at least one radio transmitter.

In some embodiments, causing at least one radio transmitter of the data collection and transmission unit to activate comprises outputting, to the data collection and transmission unit, a discrete control signal comprising instructions to activate the at least one radio transmitter.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
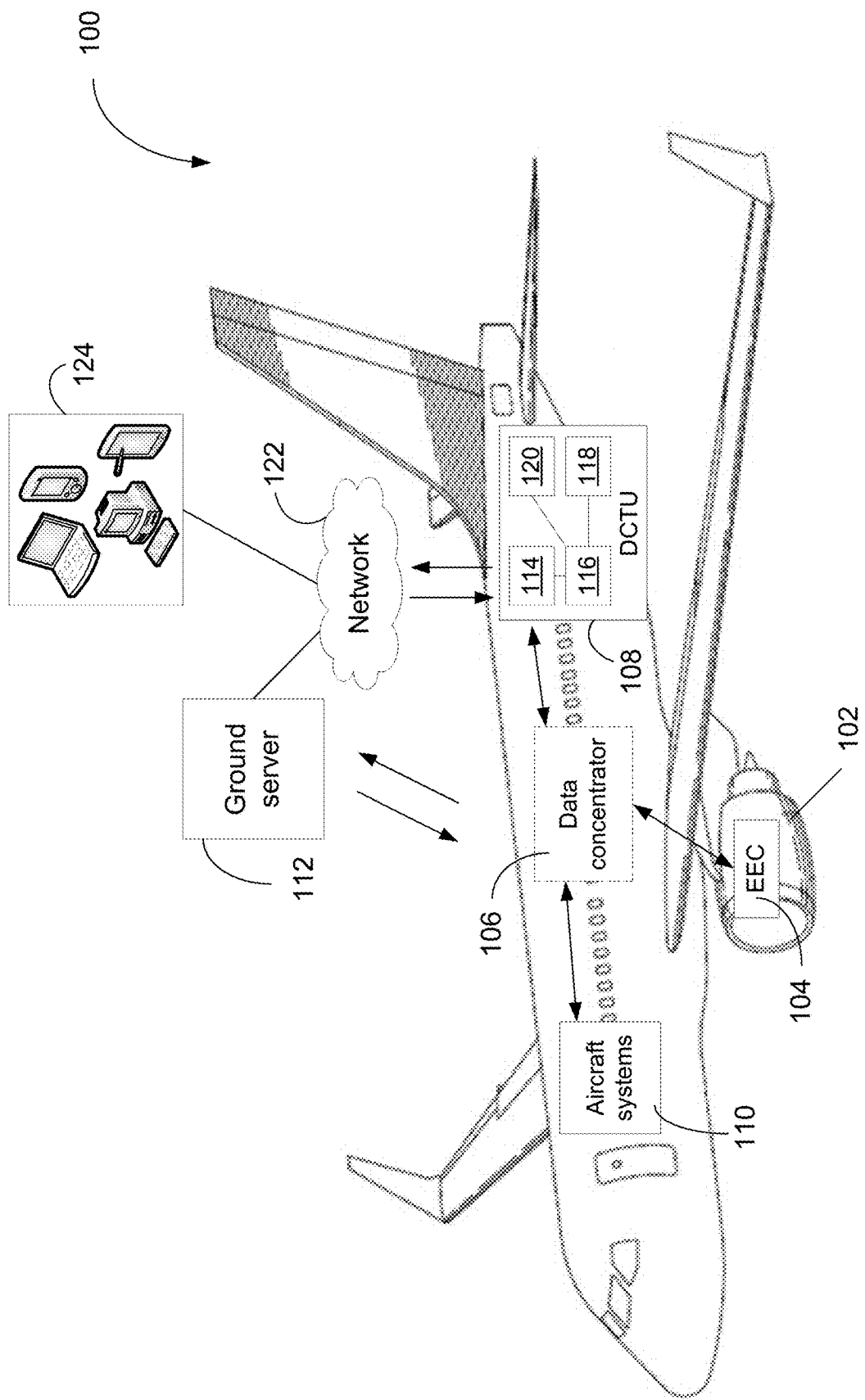
FIG. 1 is a schematic diagram of the environment of an aircraft, in accordance with an illustrative embodiment.

FIG. 1 illustrates the environment of an aircraft 100 comprising a plurality of gas turbine engines 102, one of which is shown. The engines 102 can each be any suitable aircraft propulsion system, and may include in some embodiments a hybrid-electric propulsion system or an all-electric propulsion system. Each engine 102 may be controlled by an Electronic Engine Control (EEC) 104, which may be part of a Full Authority Digital Engine Control (FADEC, not shown) used to control the overall operation and performance of the engine 102. A data concentrator 106 may receive via busses (not shown) data from the EEC 104 as well as from a Data Collection and Transmission Unit (DCTU) 108 and aircraft systems 110, which may comprise flight controls, electric systems, auxiliary power units, and the like. Alternatively, the data may be received directly without the data concentrator 106 being used as an intermediary. For instance, during flight, the EEC 102 may stream data (e.g., live engine data) to the DCTU 108. The aircraft systems 110 may also transmit data (referred to herein as "avionics data") to the DCTU 108. The DCTU 108 may also be operable to transmit to and receive information from a ground server 112 at least one of before, during, and after a flight. The ground server 112 may also communicate with the EEC 104 or the aircraft systems 110.

The engine and avionics data can be collected from a variety of data collection devices (e.g., sensors, not shown) mounted in the engine 102 or other areas of the aircraft 100. The engine and avionics data may also be collected from any suitable data source including, but not limited to, memory location(s) and intermediate calculation unit(s). The engine and avionics data illustratively indicates the status of the aircraft 100. For example, the engine and avionics data may indicate whether the aircraft 100 is on the ground or whether the engine 102 is running. Examples of the engine and avionics data include, but are not limited to, pressure, temperature, altitude, speed, acceleration, power, and torque.

The DCTU 108 is configured to collect, store, and process the engine data and/or the avionics data that it receives from the various locations of the aircraft 100. For this purpose, the DCTU 108 illustratively comprises a data interface 114, a processing unit 116, a memory 118, and one or more cellular and/or wireless radios 120. The engine data and/or the avionics data is received at the interface 114 (e.g., via one or more data buses, connectors, and the like) and processed by the processing unit 116. The processing unit 116 may then output data to be stored in the memory 118. The processing unit 116 may also output data for transmission by the radio(s) 120. For example, the processing unit 116 can produce messages for transmission which contain information of interest obtained from the engine data and/or the avionics data. The processing unit 116 may also output to the radio(s) 120 control signals, which instruct the radio(s) 120 on operation. As will be discussed further below, the radio(s) 120 are configured to output data (e.g., engine data and/or avionics data) when activated (e.g., based on input received from the EEC 104).

The DCTU 108 is illustratively configured to communicate with the ground server 112 via a network 122. The network 122 can include a public network (e.g., the Internet), one or more cellular networks, and one or more private networks (e.g., local area networks (LANs), whether wired or wireless (for example W-Fi networks), cloud-computing networks, and the like), which can be interconnected in any suitable way. The engine data and/or the avionics data can then be transmitted, periodically or punctually, from the DCTU 108 (via the radio(s) 120) to the ground server 112 for storage, analysis, or for any other purpose. In one embodiment, the DCTU 108 is implemented as a Flight-data Acquisition, Storage and Transmission (FAST™), which is an onboard engine data acquisition system configured to automatically download aircraft and engine performance data after each flight and deliver the downloaded data to a centralized database (not shown) without operator intervention.

One or more client device(s) 124 may further be configured to communicate with the DCTU 108 via the network 122 in order to obtain therefrom the engine data and/or the avionics data, which is in turn used for troubleshooting, maintenance, or any other suitable purpose. The client devices 124 may comprise any device, such as a laptop computer, a desktop computer, a personal digital assistant (PDA), a tablet, a smartphone, or the like, adapted to communicate over the network 122.

Figure 2:
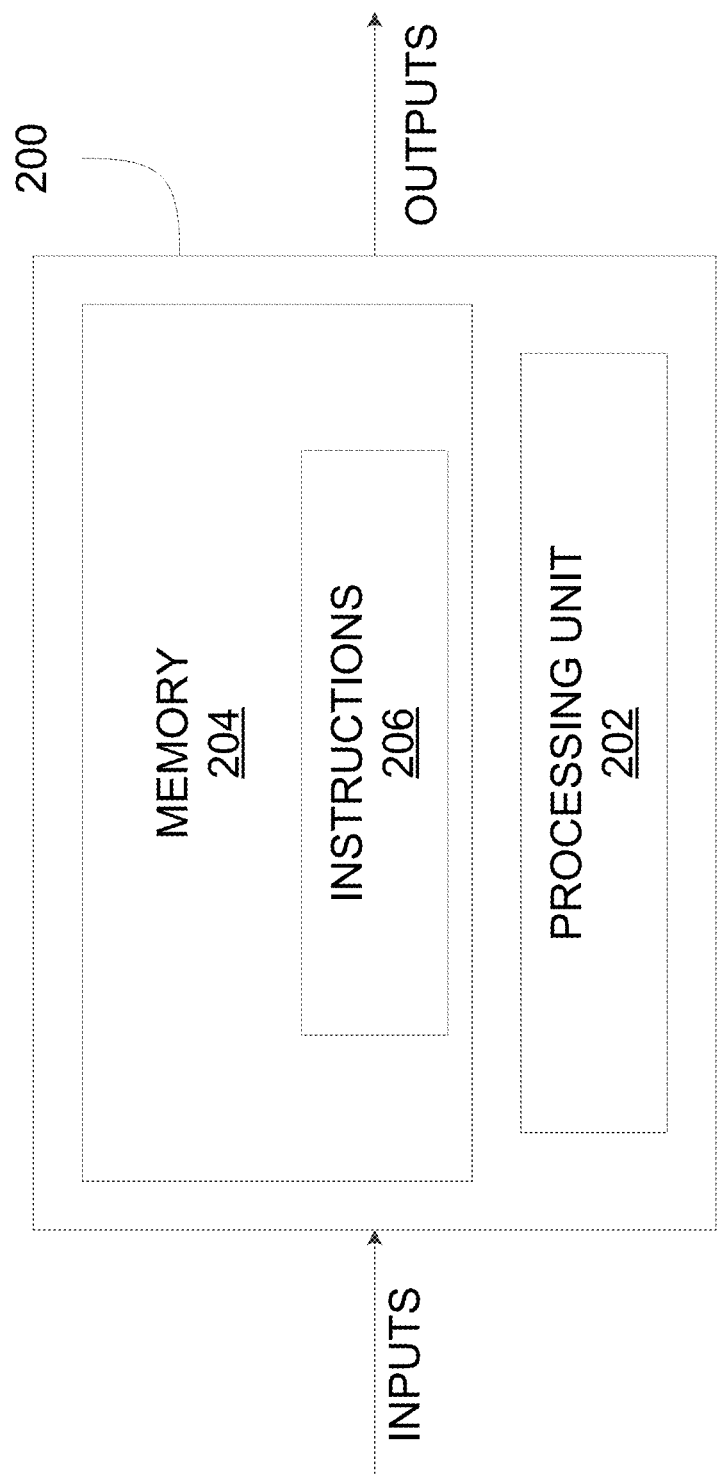
FIG. 2 is a block diagram of a computing device, in accordance with an illustrative embodiment.

The EEC 104, DCTU 108, data concentrator 106, and client device 124 illustratively include a CPU and storage. FIG. 2 is an example embodiment of a computing device 200 for implementing each of the EEC 104, DCTU 108, data concentrator 106, and client device 124 described above with reference to FIG. 1. The computing device 200 comprises a processing unit 202 and a memory 204 which has stored therein computer-executable instructions 206. The processing unit 202 may comprise any suitable devices configured to cause a series of steps to be performed such that instructions 206, when executed by the computing device 200 or other programmable apparatus, may cause the functions/acts/steps specified in the method described herein to be executed. The processing unit 202 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 204 may comprise any suitable known or other machine-readable storage medium. The memory 204 may comprise non-transitory computer readable storage medium, for example, but not limited to, an electronic, magnetic, optical, electromagnetic, infrared, or semiconductor system, apparatus, or device, or any suitable combination of the foregoing. The memory 204 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 204 may comprise any storage means (e.g., devices) suitable for retrievably storing machine-readable instructions 206 executable by processing unit 202.

Figure 3A:
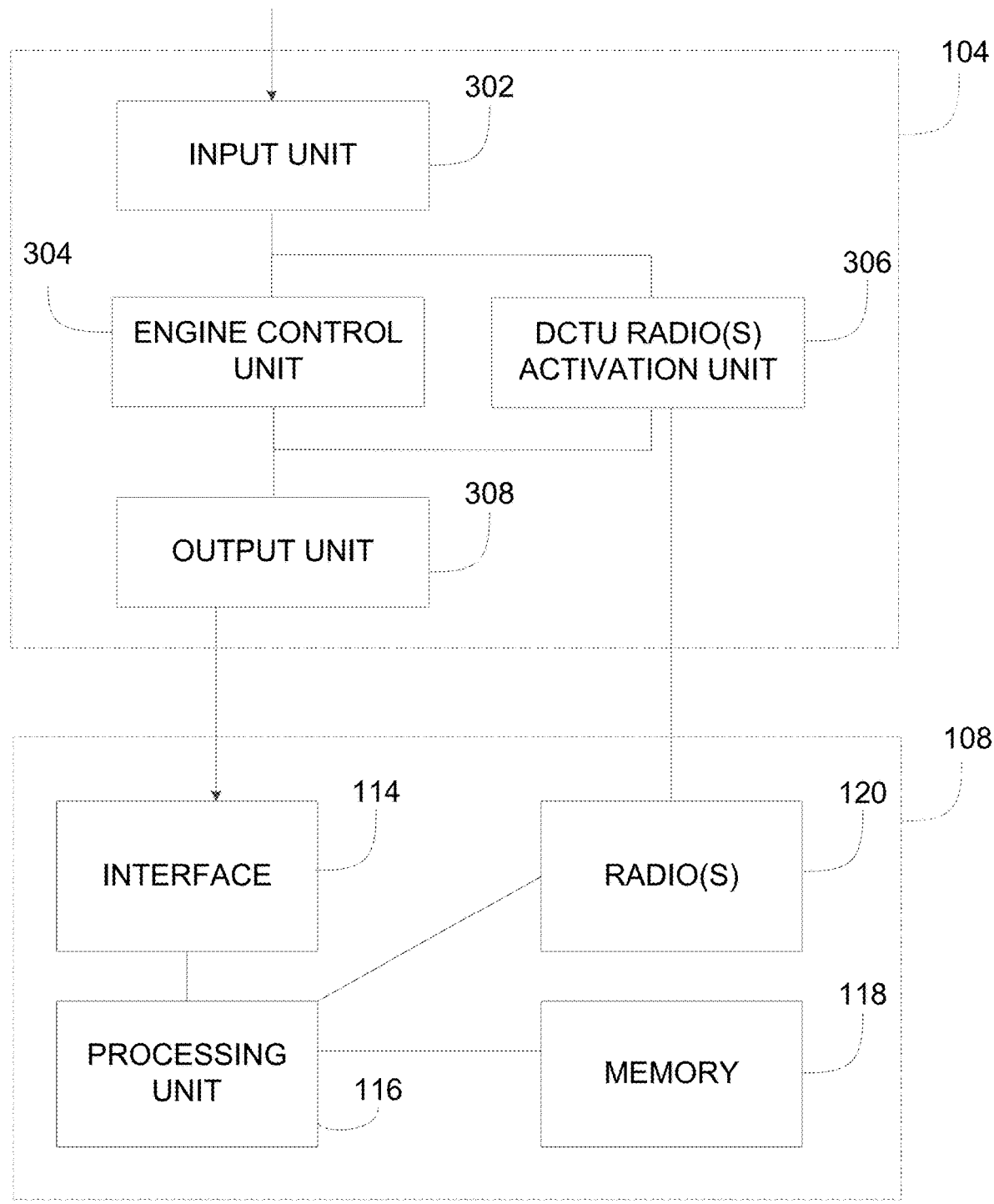
FIG. 3A illustrates a block diagram of an Electronic Engine Control (EEC), in accordance with an illustrative embodiment.

Referring now to FIG. 3A in addition to FIG. 1, the EEC 104 illustratively comprises an input unit 302, an engine control unit 304, a DCTU radio(s) activation unit 306, and an output unit 308.

The input unit 302 is configured to receive one or more inputs, such as input data from the aircraft systems 110, the DCTU 108, and/or the ground server 112. The engine control unit 304 is configured to control the operation of the engine 102, based on the received input data, in a manner known to those skilled in the art. The engine control unit 304 is shown in FIG. 3A for illustrative purposes only and its mode of operation will not be detailed herein.

The DCTU radio(s) activation unit 306 is configured to activate the cellular and/or wireless radio(s) 120 of the DCTU 108. Based on the input data (e.g., a "Weight On Wheels" signal, or the like) received at the input unit 302, the DCTU radio(s) activation unit 306 may indeed determine that the aircraft 100 is on the ground and in turn cause activation of the radio(s) 120.

In one embodiment, the DCTU radio(s) activation unit 306 may generate a control signal comprising instructions for the DCTU 108 to activate the radio(s) 120. The control signal is then provided, via the output unit 308, to the DCTU 108. The control signal may be provided by the output unit 308 to the DCTU 108 as a discrete digital signal (also referred to herein as a "discrete control signal") that can report one of two states, i.e. an "ON" (or "True") state or an "OFF" (or "False") state. When the discrete control signal reports an "OFF" state, this indicates to the DCTU 108 that the radio(s) 120 are not to be activated. In contrast, when the discrete control signal reports an "ON" state, this indicates to the DCTU 108 that the radio(s) 120 are to be activated. The discrete control signal (reporting the "ON" state) is illustratively received at the interface 114 of the DCTU 108 and the processing unit 116 of the DCTU 108 may in turn instruct the radio(s) 120 to turn on, thereby enabling transmission of data recorded in the memory 119.

Figure 3B:
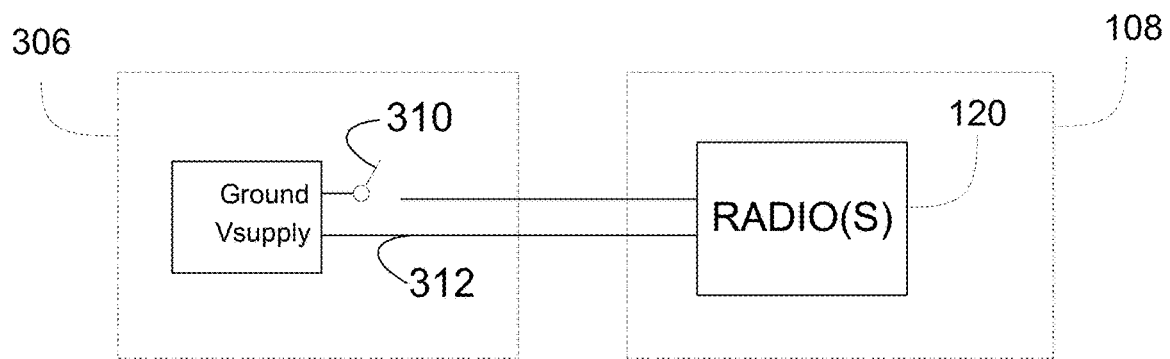
FIG. 3B illustrates a block diagram of a DCTU radio(s) activation unit, in accordance with an illustrative embodiment.

In another embodiment, the DCTU radio(s) activation unit 306 may be directly connected to the radio(s) 120 and configured to complete the electrical circuit that ultimately commands the radio(s) 120 to activate. As shown in FIG. 3B, the DCTU radio(s) activation unit 306 may be connected to the radio(s) 120 via an electrical switch 310, referred to herein as a "low side switch" or LSS. The electrical switch 310 is controllable between an open position and a closed position and is configured to provide a connection to electrical ground (labelled "Ground" in FIG. 3B) when in the closed position. The switch 310 is illustratively configured to default to the open position so that the switch 310 is only brought to the closed position when the radio(s) 120 are to be activated to allow transmission of data recorded by the DCTU 108 to ground equipment. The radio(s) 120 are also wired (e.g., via connection 312, which may be an electrical cable or the like) to an electrical power source having a given voltage (labelled "Vsupply" in FIG. 3B) that is provided from the aircraft 100 via the DCTU radio(s) activation unit 306. In other words, closing of the switch 310 completes the ground path of the electrical circuit in order to activate the radio(s) 120. When it is determined that the aircraft 100 is on the ground, the DCTU radio(s) activation unit 306 therefore commands the switch 310 to the closed position to cause the radio(s) 120 to activate.

Figure 3C:
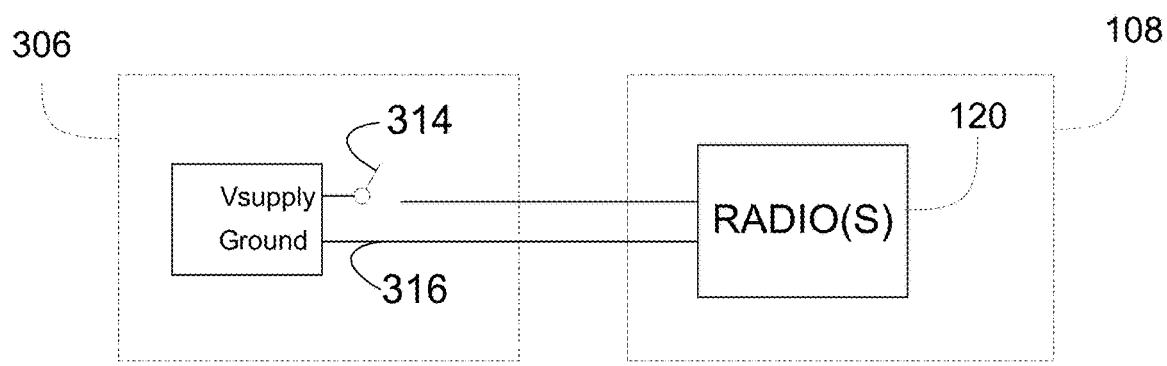
FIG. 3C illustrates a block diagram of a DCTU radio(s) activation unit, in accordance with another illustrative embodiment.

As shown in FIG. 3C, the DCTU radio(s) activation unit 306 may alternatively be connected to the radio(s) 120 via an electrical switch 314, referred to herein as a "high side switch" or HSS. The electrical switch 312 is controllable between an open position and a closed position and is configured to, when in the closed position, allow electrical power from a power source to flow to the radio(s) 120. The electrical power has a given voltage (labelled "Vsupply" in FIG. 3C) and is illustratively provided from the aircraft 100, via the DCTU radio(s) activation unit 306. Similarly to the switch 310, the switch 312 may be configured to default to the open position so that the switch 312 is only brought to the closed position when the radio(s) 120 are to be activated to allow transmission of data recorded by the DCTU 108. The radio(s) 120 are also wired (e.g., via connection 316, which may be a cable or the like) to electrical ground (labelled "Ground" in FIG. 3C). When it is determined that the aircraft 100 is on the ground, the DCTU radio(s) activation unit 306 thus commands the switch 312 to the closed position, which results in electrical power being supplied to the radio(s) in order to cause activation thereof.

Figure 4:
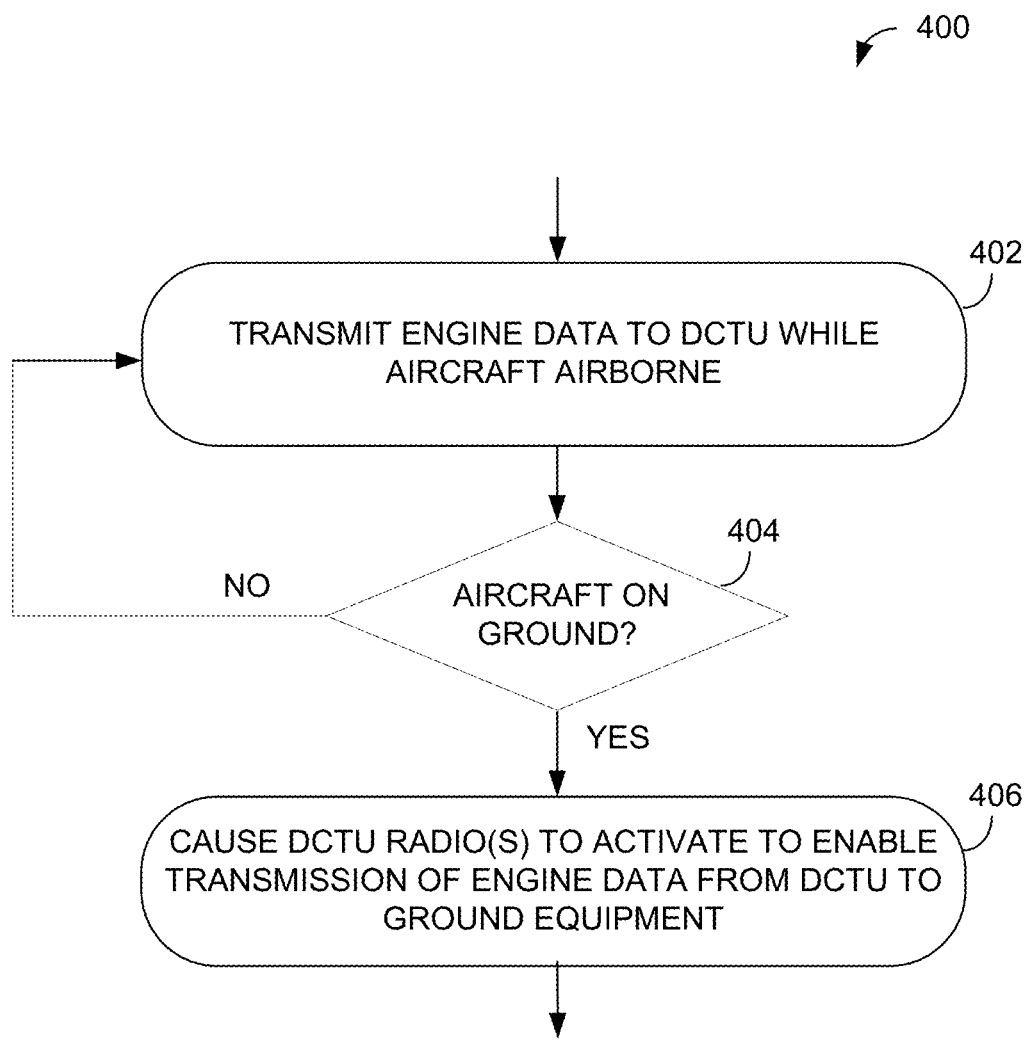
FIG. 4 is a flowchart of a method implemented by the EEC of FIG. 3A for transmitting data from the aircraft of FIG. 1, in accordance with an illustrative embodiment.

Referring now to FIG. 4, an example method 400 (implemented by the EEC 104 of FIG. 3A) for transmitting data from an aircraft (such as the aircraft 100 of FIG. 1) will now be described. At step 402, engine data is transmitted to the DCTU (reference 108 in FIG. 1) while the aircraft 100 is airborne. The method 400 then assesses at step 404 whether the aircraft is on ground. If it is determined at step 404 that the aircraft 100 is not on ground, the method 400 returns to step 402. Otherwise, the next step 406 is to cause the DCTU radio(s) (reference 120 in FIG. 1) to activate in order to enable transmission of the engine data from the DCTU 108 to ground equipment. As discussed herein above, step 406 may comprise outputting to the DCTU 108 a discrete control signal comprising instructions to activate the radio(s) 120. Step 406 may alternatively comprise actuating a low side switch (reference 310 in FIG. 3B) provided in the EEC 104 in order to complete the ground path of an electrical circuit that ultimately causes the radio(s) 120 to activate. Step 406 may also comprise actuating a high side switch (reference 314 in FIG. 3C) provided in the EEC 104 in order to supply electrical power to the radio(s) 120 and cause them to activate.

Because the EEC 104 activates the DCTU radio(s) 120 when it is determined that the aircraft 100 is on the ground (i.e. the engine 102 is detected to be in a "on ground" state), the systems and methods described herein may, in one embodiment, prevent activation of the cellular and/or wireless radio(s) 120 of the DCTU 108, and accordingly prevent data transmission, while in flight. As known to those skilled in the art, the Design Assurance Level (DAL) associated with the EEC 104 is higher than the DAL associated with the DCTU 108. In particular, the EEC 104 has a DAL of "A" and a device having a DAL of "C" or better would typically be required to control activation of the radio(s) 120 in the DCTU 108. Using the systems and methods described herein allows to use the EEC 104 to directly control the activation of the radio(s) 120, without depending on software controls in the DCTU 108. As a result, in one embodiment, the DCTU software need not be certified to DAL "C" and the DCTU 108 may, as such, be associated with a DAL lower than "C". In one embodiment, the DCTU 108 is a DAL "E" certified device. In other words, according to one embodiment, a higher level DAL certified device (the EEC 104) may be used to directly control a particular function of a connected device (the DCTU 108), thus allowing the connected device to be certified to a lower DAL level than would otherwise be required if the connected device were controlling the function itself. This may in turn decrease overall development costs.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A communication system for transmitting data from an aircraft, the aircraft comprising at least one engine, the system comprising:
   a data collection and transmission unit configured to collect and transmit data received from one or more locations in the aircraft, the data collection and transmission unit comprising at least one radio transmitter; and
   at least one engine controller for the at least one engine, the at least one engine controller communicatively coupled to the data collection and transmission unit and configured to transmit, while the aircraft is airborne, engine data to the data collection and transmission unit, and, responsive to determining that the aircraft is on ground, cause the at least one radio transmitter to activate for transmitting the engine data from the data collection and transmission unit to at least one ground equipment, the at least one engine controller configured to prevent activation of the at least one radio transmitter, and accordingly prevent transmission of the engine data from the data collection and transmission unit to the at least one ground equipment, while the aircraft is in flight.

2. The system of claim 1, wherein the at least one engine controller comprises an electrical switch controllable between an open position and a closed position and configured to, when in the closed position, connect the at least one radio transmitter to electrical ground.

3. The system of claim 2, wherein the at least one engine controller is configured to bring the electrical switch to the closed position to cause the at least one radio transmitter to activate.

4. The system of claim 1, wherein the at least one engine controller comprises an electrical switch controllable between an open position and a closed position and configured to, when in the closed position, supply electrical power to the at least one radio transmitter.

5. The system of claim 4, wherein the at least one engine controller is configured to bring the electrical switch to the closed position to cause the at least one radio transmitter to activate.

6. The system of claim 1, wherein the at least one engine controller is configured to output, to the data collection and transmission unit, a discrete control signal comprising instructions to activate the at least one radio transmitter.

7. The system of claim 1, wherein the Design Assurance Level (DAL) associated with the at least one engine controller is higher than the DAL associated with the data collection and transmission unit, the at least one engine controller having a DAL of "A" and the data collection and transmission unit having a DAL lower than "C".

8. The system of claim 7, wherein the data collection and transmission unit is a DAL "E" certified device.

9. A computer-implemented method for transmitting data from an aircraft, the aircraft comprising at least one engine, the method comprising:
   at at least one engine controller for the at least one engine, transmitting, while the aircraft is airborne, engine data to a data collection and transmission unit of the aircraft; and
   responsive to determining that the aircraft is on ground, causing at least one radio transmitter of the data collection and transmission unit to activate for transmitting the engine data from the data collection and transmission unit to at least one ground equipment, accordingly preventing activation of the at least one radio transmitter, and transmission of the engine data from the data collection and transmission unit to the at least one ground equipment, while the aircraft is in flight.

10. The method of claim 9, wherein causing at least one radio transmitter of the data collection and transmission unit to activate comprises bringing an electrical switch of the at least one engine controller to a closed position, the electrical switch configured to, when in the closed position, connect the at least one radio transmitter to electrical ground.

11. The method of claim 9, wherein causing at least one radio transmitter of the data collection and transmission unit to activate comprises bringing an electrical switch of the at least one engine controller to a closed position, the electrical switch configured to, when in the closed position, supply electrical power to the at least one radio transmitter.

12. The method of claim 9, wherein causing at least one radio transmitter of the data collection and transmission unit to activate comprises outputting, to the data collection and transmission unit, a discrete control signal comprising instructions to activate the at least one radio transmitter.

* * * * *